(12) United States Patent
Van Hensbergen

(10) Patent No.: US 7,185,341 B2
(45) Date of Patent: Feb. 27, 2007

(54) SYSTEM AND METHOD FOR SHARING PCI BUS DEVICES

(75) Inventor: Eric Van Hensbergen, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 701 days.

(21) Appl. No.: 10/112,512

(22) Filed: Mar. 28, 2002

(65) Prior Publication Data

US 2003/0188060 A1 Oct. 2, 2003

(51) Int. Cl.
*G06F 13/00* (2006.01)

(52) U.S. Cl. ............... 719/312; 719/311; 710/100; 710/260; 711/1; 711/100; 711/147; 711/148; 711/152; 711/153

(58) Field of Classification Search ......... 718/106; 710/3, 100, 260, 267, 268, 300; 711/100, 711/1, 147, 148, 152, 153; 709/205, 214, 709/213, 215; 719/311, 312; 707/1, 8, 200, 707/205

See application file for complete search history.

(56) References Cited

U.S. PATENT DOCUMENTS

| | | | | |
|---|---|---|---|---|
| 5,446,841 A | * | 8/1995 | Kitano et al. ............... | 709/213 |
| 5,634,073 A | * | 5/1997 | Collins et al. .................. | 710/5 |
| 5,796,605 A | * | 8/1998 | Hagersten ...................... | 700/5 |
| 5,907,862 A | * | 5/1999 | Smalley ....................... | 711/163 |
| 5,913,045 A | * | 6/1999 | Gillespie et al. ............ | 710/311 |
| 6,349,331 B1 | * | 2/2002 | Andra et al. ................. | 709/220 |
| 6,499,048 B1 | * | 12/2002 | Williams ..................... | 718/102 |
| 6,530,002 B1 | * | 3/2003 | Martin et al. ............... | 711/154 |
| 6,587,868 B2 | * | 7/2003 | Porterfield .................. | 709/203 |
| 6,604,159 B1 | * | 8/2003 | Thekkath et al. ........... | 710/110 |
| 6,772,255 B2 | * | 8/2004 | Daynes ........................ | 710/200 |
| 6,792,497 B1 | * | 9/2004 | Gold et al. .................. | 710/317 |
| 6,813,522 B1 | * | 11/2004 | Schwarm et al. .............. | 700/5 |
| 2002/0010880 A1 | * | 1/2002 | Williams ...................... | 714/43 |
| 2002/0029310 A1 | * | 3/2002 | Klein .......................... | 710/260 |
| 2002/0065989 A1 | * | 5/2002 | Chauvel et al. ............. | 711/130 |
| 2002/0073164 A1 | * | 6/2002 | Hagersten et al. .......... | 709/215 |
| 2003/0126336 A1 | * | 7/2003 | Creta et al. ................. | 710/305 |

* cited by examiner

*Primary Examiner*—William Thomson
*Assistant Examiner*—Andy Ho
(74) *Attorney, Agent, or Firm*—VanLeeuwen & VanLeeuwen; Casimer K. Salys

(57) ABSTRACT

A plurality of processors share a device using a common PCI bus. Each processor includes a PCI addressable memory area where data sent to or received from the device is stored. Each processor includes a unique identifier and also includes a PCI controller for accessing the PCI bus. Data is sent from a processor to the device by writing the data to the PCI addressable memory area and signaling the device using the processor's unique identifier. The device determines the memory address corresponding to the processor's unique identifier and reads the data. The device sends data to a processor by writing the data to the PCI addressable memory area and signaling the processor using a PCI mailbox assigned to the device and included in the processor's PCI controller. Device parameters are sent by the processors to the device during initialization and the device determines whether a parameter conflict exists.

21 Claims, 6 Drawing Sheets

SYSTEM AND METHOD FOR SHARING PCI BUS DEVICES

BACKGROUND OF THE INVENTION

1. Technical Field

The present invention relates in general to a system and method for sharing computer devices. More particularly, the present invention relates to a system and method for multiple hosts to share devices on a common bus.

2. Description of the Related Art

Computer systems in general and International Business Machines (IBM) compatible personal computer systems in particular have attained widespread use for providing computer power to many segments of today's modern society. A personal computer system can usually be defined as a desk top, floor standing, or portable microcomputer that includes a system unit having a system processor and associated volatile and non-volatile memory, a display monitor, a keyboard, one or more diskette drives, a fixed disk storage device and an optional printer. One of the distinguishing characteristics of these systems is the use of a system board to electrically connect these components together.

These personal computer systems are information handling systems which are designed primarily to give independent computing power to a single user (or a relatively small group of users in the case of personal computers which serve as computer server systems) and are inexpensively priced for purchase by individuals or small businesses. A personal computer system may also include one or a plurality of I/O devices (i.e. peripheral devices) which are coupled to the system processor and which perform specialized functions. Examples of I/O devices include modems, sound and video devices or specialized communication devices. Nonvolatile storage devices such as hard disks, CD-ROM drives and magneto-optical drives are also considered to be peripheral devices.

Computers are often linked to one another using a network, such as a local area network (LAN), wide area network (WAN), or other types of networks such as the Internet. By linking computers, one computer can use resources owned by another computer system. These resources can include files stored on nonvolatile storage devices and resources such as printers.

Multiple processors are more often being employed in information handling systems that are becoming increasingly complex. Multiple processors provides a system with increased computing power as compared with systems with a single microprocessor. One challenge, however, faced by designers of systems with multiple processors is the usage of internal and external devices. Each processor typically uses a bus, such as a PCI bus, to communicate with internal and external devices. Use of devices, therefore, is accomplished by including separate devices for each insulated bus or having a master/slave relationship whereby one of the processors manages the usage of the devices for all processors. While mechanisms exist for hosts to communicate to multiple PCI devices on a shared PCI bus, there is no existing mechanisms that allow multiple hosts on a PCI bus to share devices. The challenge of using separate devices for each bus is the inclusion of redundant devices that, in turn, create power and logistic challenges for the system designer. The challenge of using a master/slave relationship is a decrease in throughput caused by extra communication between the processors and the extra load undertaken by the PCI controller of the "master" processor as additional PCI commands are passed through the "master" processor to its PCI controller. What is needed, therefore, is a system and method in which devices on a common bus can be shared by multiple hosts without the need for additional inter-processor communications.

SUMMARY

It has been discovered that the aforementioned challenges are overcome by utilizing a shared bus, such as a PCI bus, among several hosts. Two or more hosts share a common PCI bus. In addition, each host processor has its own PCI-addressable memory area that is used to store control registers for the shared PCI devices. In addition, each host processor has its own PCI controller to manage the host's use of the shared PCI bus.

At initialization, each host processor initializes a local configuration space in its local PCI-addressable memory area along with a memory lock to control access of the PCI-addressable memory area. The host also initializes a PCI mailbox in its PCI controller. Each host processor has a unique identifier to identify it from the other hosts sharing the PCI bus. The memory address corresponding to the host's local configuration space is passed to the shared PCI device.

Upon receiving the host's memory address for the host's local configuration space, the PCI device initializes configuration data corresponding to the host. This configuration data may include the host unique identifier, the address of the host's local memory area, and the mailbox address that has been setup in the host's PCI controller.

Each PCI device may have a different configuration. For example, a PCI based LAN adapter has different configuration needs than a PCI based hardware security module or a PCI based Fibre channel adapter. The configuration data for the particular device is written to the host's local memory area. The host then configures the PCI device by writing device configuration data to the host's local memory area. The device configuration data is read by the device and used to set the device's registers and other control settings. Because the device is used by more than one host, a check is made to determine whether the various hosts are attempting to use the device in incompatible configurations from one another, in which case the device signals an error. For example, an error may arise if one host configures a LAN adapter to operate at 10 Mbps while another host configures the LAN adapter to operate at 100 Mbps.

After initialization, hosts send a request and corresponding data to the shared PCI device by writing the request and data to the control registers and buffers that were initialized in the host's local memory area. The host then signals the shared device by writing the host's unique identifier to the device's configuration space at the device. This causes the device to wake up and read the unique identifier. The address of the host's local memory area is determine based on the host unique identifier. The device then retrieves the control registers and data from the host's local memory area and uses the control information to perform the operation requested by the host.

When a shared PCI device receives a request (or response) and corresponding data, it writes the data to the host's local memory area. The PCI device then signals the host using the mailbox that was configured for the device in the host's PCI controller. Signaling the PCI mailbox causes the PCI controller to send an interrupt to the host. The mailbox used corresponds to the PCI device, which in turn corresponds to a memory space in the host's local memory.

The host then reads the memory space to retrieve the request (or response) and corresponding data.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

The following is intended to provide a detailed description of an example of the invention and should not be taken to be limiting of the invention itself. Rather, any number of variations may fall within the scope of the invention which is defined in the claims following the description.

Figure 1:
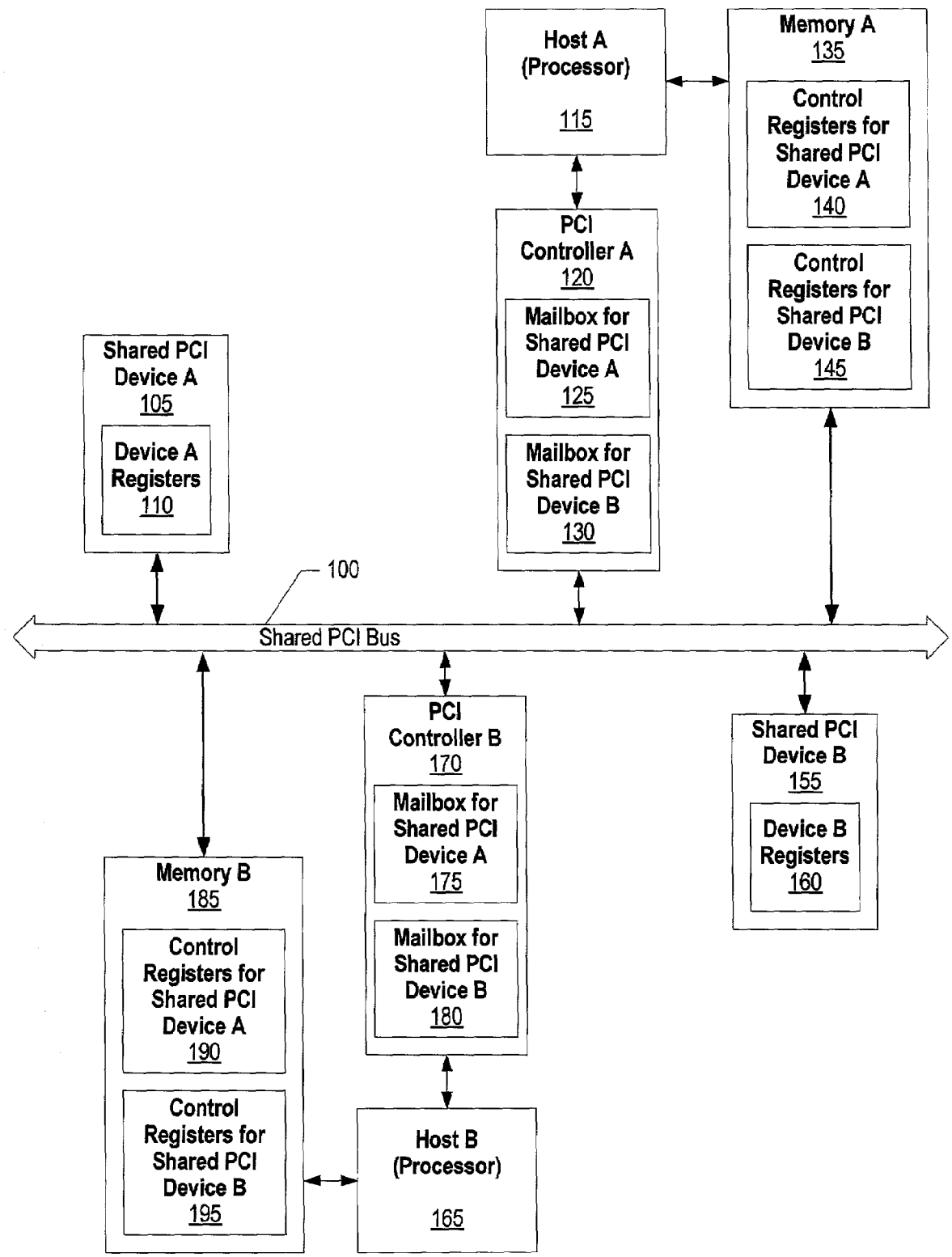
FIG. 1 is a block diagram of an information handling system with two hosts sharing two devices on a common bus.

FIG. 1 is a block diagram of an information handling system with two hosts sharing two devices on a common bus. Shared PCI bus (100) is shown with two shared PCI devices (Device A 105 and Device B 155) and two hosts (Host A 115 and Host B 165) that can access and use the devices.

Each host has its own PCI addressable memory area and its own PCI controller logic. Host A (115) is shown with Memory A (135) and PCI Controller (120), while Host B (165) is shown with Memory B (185) and PCI Controller (170). The PCI controllers are used to manage and control the respective hosts' access and use of PCI devices. Each PCI controller includes "mailboxes" that are used by PCI devices in order to send an interrupt to the host processors. In the example shown, PCI Controller A (120) includes two mailboxes: Mailbox A (125) that is used for Shared PCI Device A (105) and Mailbox B (130) that is used for Shared PCI Device B (155). Likewise, PCI Controller B (170) includes two mailboxes: Mailbox A (175) that is used for Shared PCI Device A (105) and Mailbox B (180) that is used for Shared PCI Device B (155).

When Shared PCI Device A (105) has information to pass to Host A (115) it signals Mailbox A (125) in Host A's PCI Controller (120). Similarly, when Shared PCI Device A (105) has information to pass to Host B (165) it signals Mailbox A (175) in Host B's PCI Controller (170).

Shared PCI Device B (155) signals the host processors in a similar fashion using its own mailboxes that have been setup in the respective PCI controllers. When Shared PCI Device B (155) has information to pass to Host A (115) it signals Mailbox B (130) in Host A's PCI Controller (120). Similarly, when Shared PCI Device B (155) has information to pass to Host B (165) it signals Mailbox B (180) in Host B's PCI Controller (170). While the example shown in FIG. 1 shows two hosts and two shared PCI devices, additional hosts and PCI devices can be configured.

Each shared PCI device includes a local memory area for managing the device. Shared PCI Device A (105) includes Device A Registers (110) and Shared PCI Device B (155) includes Device B Registers (160). The amount of memory for the devices and the configuration of the memory is based upon the type of device. For example, a PCI based Local Area Network (LAN) adapter device would include a certain amount of memory and memory configuration (i.e., buffer spaces, registers, etc.). Likewise, a Fibre Channel adapter device, a PCI based modem, and a hardware security (encryption) module would each have their own memory needs and memory configurations based upon the tasks being performed by the respective devices. In order to share the PCI devices, copies of the devices' memory area are maintained for each host sharing the device in a PCI addressable memory area. Host A (115) uses Memory A (135) to maintain its copies of shared PCI device registers, while Host B (165) uses Memory B (185) to maintain its copies of shared PCI device registers. In the example shown, Host A's memory (135) includes a memory area (140) for maintaining control registers for Shared PCI Device A (105) and a memory area (145) for maintaining control registers for Shared PCI Device B (165). Likewise, Host B's memory (185) includes a memory area (190) for maintaining control registers for Shared PCI Device A (105) and a memory area (195) for maintaining control registers for Shared PCI Device B (155).

To send data from Host A (115) to Shared PCI Device A (105), Host A writes the request and data to memory area 140 and signals Shared PCI Device A (105). Device A (105) reads the PCI addressable memory area (140) to determine the request and data. The read request and data are written to actual registers in Device A (105) and processed by the device. For example, in a LAN adapter, the request may be to send a packet of data to another LAN adapter. Data is also sent from Host A (115) to Device B (155) using PCI addressable memory area 145. Likewise, data is sent from Host B (165) to Device A (105) using PCI addressable memory area 190 and from Host B to Device B (165) using PCI addressable memory area 195. After a host writes request data to a memory area corresponding to a shared PCI device, the host signals the device by writing a unique identifier that corresponds to the host to the device's local memory area. For example, Host A (115) would signal Device A (105) by writing Host A's unique identifier to Device A's memory area (110), and to signal Device B (155), Host A would write its unique identifier to Device B's memory area (160). Likewise, Host B would write its unique identifier to the memory area corresponding to the shared PCI Device with which it is communicating in order to have the device wake up and read the request and data from the host's PCI addressable memory space.

When a shared PCI device receives data to be sent to a host, it writes the data to the corresponding memory area and then signals the host via a PCI mailbox interrupt. If Shared PCI Device A (105) receives data for Host A (115), it writes the data to memory area 140 and signals Host A using mailbox 125. If Device A (105) receives data for Host B (165), it writes the data to memory area 190 and signals Host B using mailbox 175. Likewise, if Shared PCI Device B (155) receives data for Host A (115), it writes the data to memory area 145 and signals Host A using mailbox 130. Finally, if Device B (155) receives data for Host B (165), it writes the data to memory area 195 and signals Host B using mailbox 180.

Figure 2:
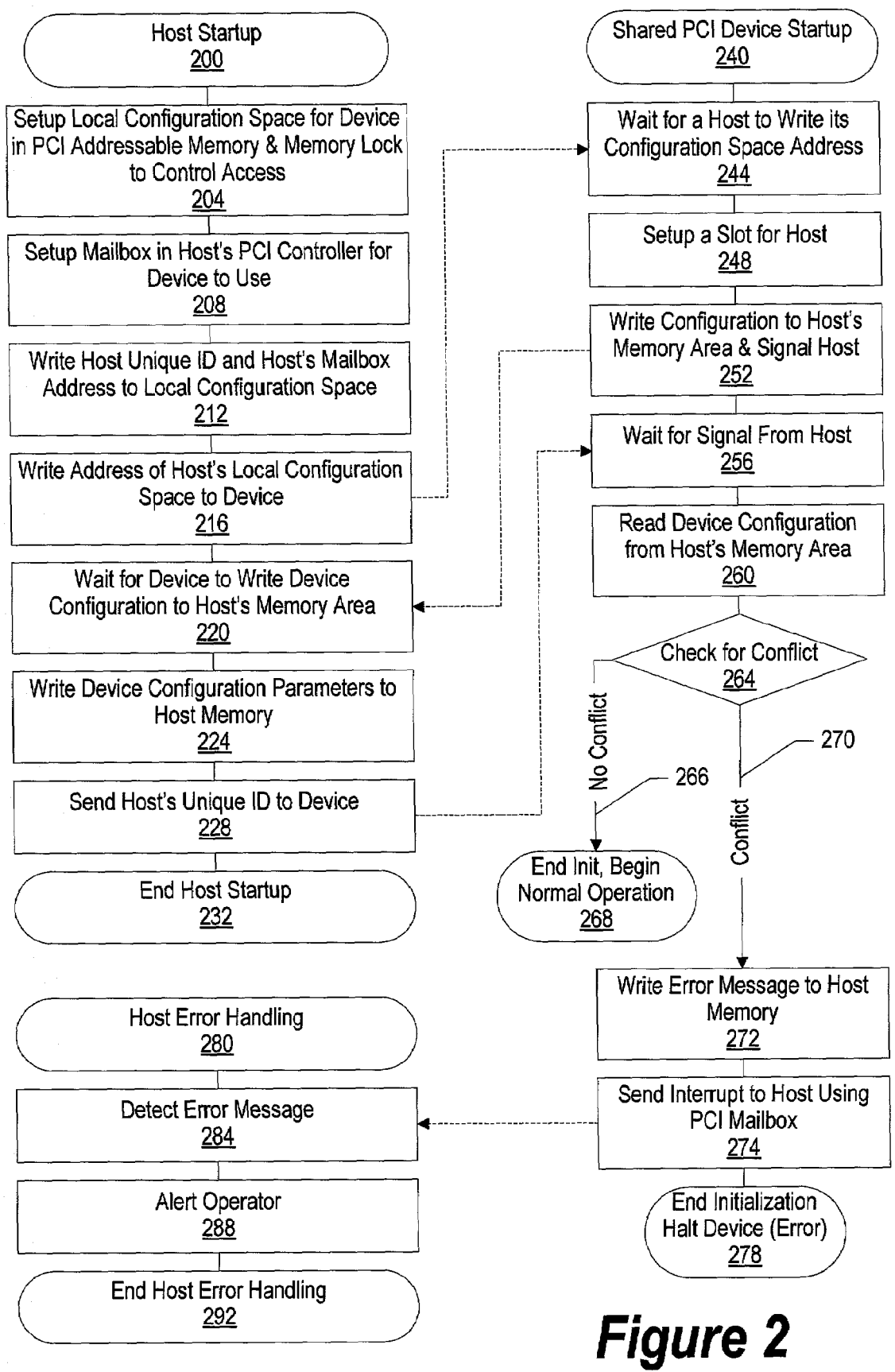
FIG. 2 is a flowchart showing initialization steps for a host and shared PCI device.

FIG. 2 is a flowchart showing initialization steps for a host and shared PCI device. Host startup commences at 200 and is performed for each host (i.e., processor) that is using shared PCI devices. Shared PCI device startup commences at 240 and is performed for each shared PCI device, such as PCI based LAN adapters and Fibre Channel adapters.

Host startup processing commences at 200 whereupon the host sets up a local configuration space for the shared device in PCI-addressable memory and establishes a memory lock to control access to the memory area (step 204). During step 204, the host allocates memory in a PCI-addressable memory area that is sufficient to handle the device's configuration needs. For example, with a LAN adapter space would be allocated to store input and output buffers and control information regarding packets being sent and received through the adapter. The host identifies a PCI mailbox for the device to use within the host's PCI controller (step 208). This mailbox will be used by the shared PCI device to signal (interrupt) the host and inform the host that the PCI device has data waiting for the host. The host's unique identifier and the mailbox address assigned to the PCI device in the host's PCI controller are written to a data area in the allocated PCI-addressable memory space (step 212). The address of the allocated PCI-addressable memory space is written to the device (step 216) which causes an interrupt in the device.

The device, which was waiting for an interrupt, is awaken when the host writes the address of the host's configuration space to the device (step 244). The device reads the host's unique identifier and the mailbox address from the PCI-addressable memory area and sets up a configuration slot in the device's memory area corresponding to the device (step 248). Configuration slots include information regarding the various hosts that are using the shared device. Information stored in the configuration slots may include the hosts' unique identifiers, the PCI-addressable memory spaces corresponding to each host, the mailbox address that the device will use to interrupt the hosts, as well as other control information that the device uses to manage the various hosts' usage of the shared device. Devices may have differing configuration needs from one another. To accommodate these differences, the device configures the host's PCI-addressable memory area with buffers and control registers that the device uses to operate and handle requests from the host and pass responsive data back to the host (step 252). After the configuration data is written to the host's PCI-addressable memory, the host is interrupted using the assigned mailbox address in the host's PCI controller (step 252). The shared device then waits for a signal (interrupt) from the host (step 256).

The host is interrupted by the shared device by the device using the mailbox assigned to the device in the host's PCI controller (step 220). The host then writes configuration parameters to the host's PCI-addressable memory space used to manage the device (step 224). For example, with a LAN adapter one of the configuration parameters that may be set is the speed (e.g., 10 Mbps or 100 Mbps) at which the host requests the device to operate. The host's unique identifier is written to the device in order to wake the device up and read the configuration data (step 228) and host startup processing ends at 232.

The device receives the host's unique identifier and wakes up (step 256). The device reads the host's configuration parameter data from the host's PCI-addressable memory space (step 260). A determination is made as to whether the configuration parameters set by the host conflict with parameters set by other devices or conflict with the parameters allowed by the device (decision 264). For example, LAN adapters typically operate in one predetermined speed. If one host requests that a LAN adapter operate at 10 Mbps while another host requests that the same adapter operate at 100 Mbps, a conflict error occurs. If there is no conflict, decision 264 branches to "no conflict" branch 266 whereupon shared device initialization ends and normal shared device operation commences at 268.

On the other hand, if a conflict is noted, decision 264 branches to "conflict" branch 270 whereupon an error message is written to the host's PCI-addressable memory area corresponding to the device (step 272). The device sends an interrupt to the host using the PCI mailbox assigned to the device in the host's PCI controller (step 274). Device initialization ends in an error condition at 278.

Host error handling of a shared PCI device commences at 280 whereupon the host detects an error message by receiving the interrupt sent to the host from the device through the mailbox assigned to the device in the host's PCI controller and the host reading the error data from the PCI-addressable memory area (step 284). The host alerts the operator that a shared device conflict exists along with any detailed information provided by the device regarding the error (step 288). Host error handling of a shared PCI device ends at 292.

Figure 3:
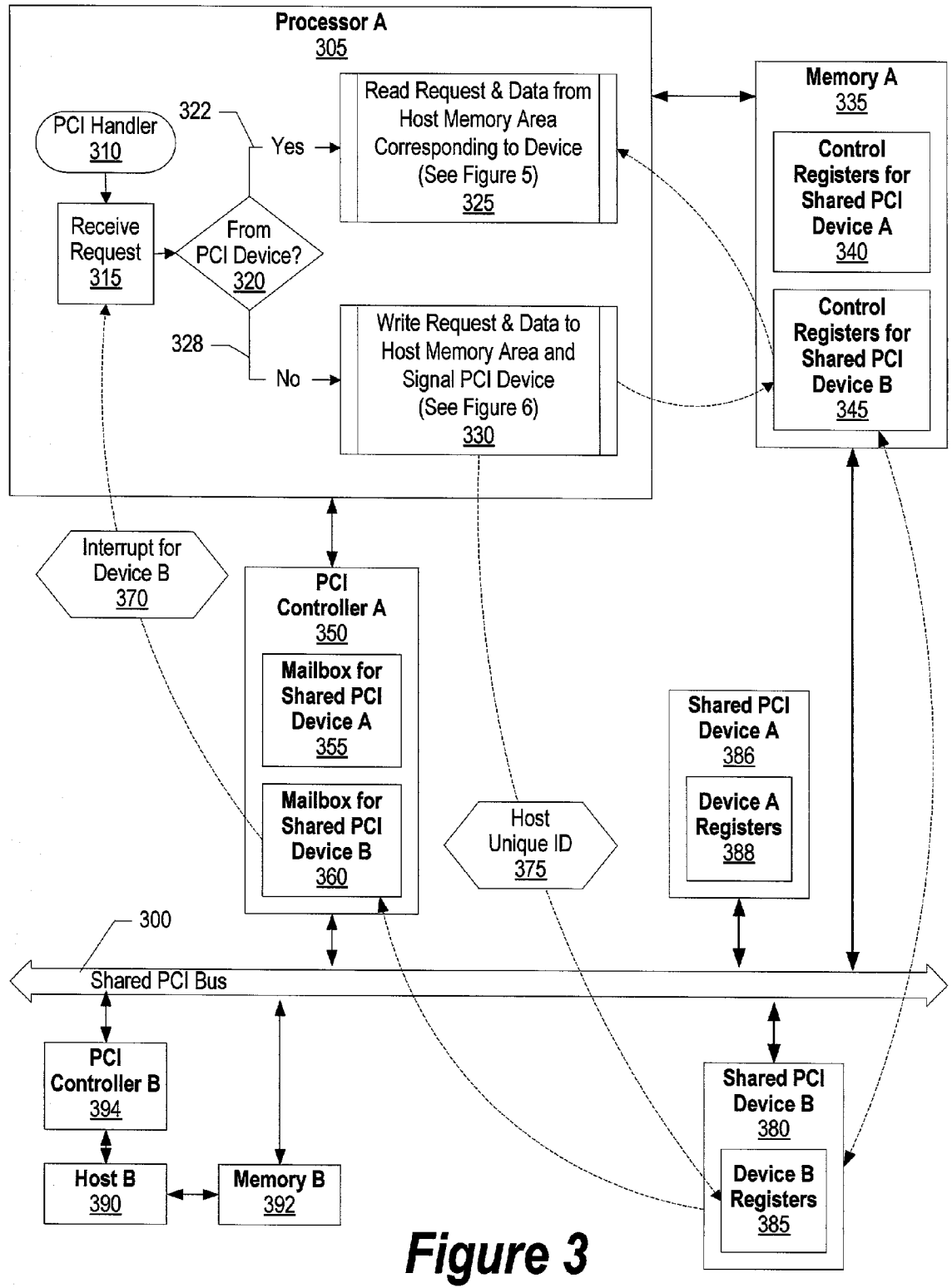
FIG. 3 is high level flowchart of steps used by a host to communicate with a shared PCI device.

FIG. 3 is high level flowchart of steps used by a host to communicate with a shared PCI device. The components shown in FIG. 3 are similar to those shown in FIG. 1 with one of the processors (Processor A 305) enlarged to show high level processing steps performed to utilize a shared PCI device. In the example shown, Processor A (305) is sending and receiving data from one of the shared PCI devices, namely Shared PCI Device B (380).

The devices and processors communicate with one another through shared PCI bus 300. In the example shown in FIG. 3, there are two processors (Processor A (305) and Processor B (390). Each of the processors has its own PCI-addressable memory area (Memory A (335) is accessible by Processor A and Memory B (392) is accessible by Processor B). The memory areas include control register spaces for managing the shared PCI devices (control registers 340 and 345 are shown configured within Memory A 335, corresponding control register spaces are included in Memory B but not shown in FIG. 3). Control registers in the host's PCI-addressable memory correspond with that host's usage of the shared devices. Control Registers 340 correspond with Shared PCI Device A's registers (388), while Control Registers 345 correspond with Shared PCI Device B's registers (385). Each host maintains its instance of the shared device. In this manner, each host is unaware of other hosts' data and requests and the device writes and reads data to and from the various hosts' PCI-addressable memory to control the settings of the device's registers.

Each of the processors also has access to a PCI controller for managing the processor's usage of PCI devices. Processor A utilizes PCI Controller A (350) which includes mailboxes (mailboxes 355 and 360) that are assigned to shared PCI devices for signaling (i.e., interrupting) the processor when a PCI device has data for the processor. In the example shown, mailbox 355 is assigned to shared PCI device A (386) while mailbox 360 is assigned to shared PCI device B (380). Similarly, Processor B (390) utilizes PCI Controller B (394) for managing its access of PCI devices. PCI Controller B (394) also includes mailboxes that are assigned to and used by shared PCI devices for signaling Processor B when the devices have data for the processor.

The processors include a PCI handling routine for sending data to and receiving data from shared PCI devices. A high level flow diagram for a PCI handling routine used by Processor A is shown starting at 310. The processor receives a request (step 315). The request is either from a program that is requesting to send data to a shared PCI device or from a PCI device that is sending data to the processor. In the case of a shared PCI device, such as PCI device B (380) providing data to the processor, the PCI device sets a register in an assigned mailbox within the PCI controller used by the processor. Setting the PCI mailbox triggers an interrupt (370) which is received by the processor.

The processor determines whether the request is from a PCI device (decision 320). If the request is from a PCI device (i.e., the processor received an interrupt from the PCI controller resulting from the shared PCI device setting a mailbox register), decision 320 branches to "yes" branch 322 whereupon the processor reads the request and data from the host's PCI-addressable memory area that corresponds to the shared PCI device (predefined process 325, see FIG. 5 for further details). On the other hand, if the request is not from a PCI device, decision 320 branches to "no" branch 328 whereupon the request and data are written to the host's PCI-addressable memory area that corresponds to the device and the host's unique identifier (375) is written to the shared PCI device informing the device that the processor has a request and data for the device to process (predefined process 330, see FIG. 6 for further details).

Processor A (305) has access to PCI-addressable Memory A (335) for memory operations and access to PCI Controller A (350) for utilization of PCI devices.

Figure 4:
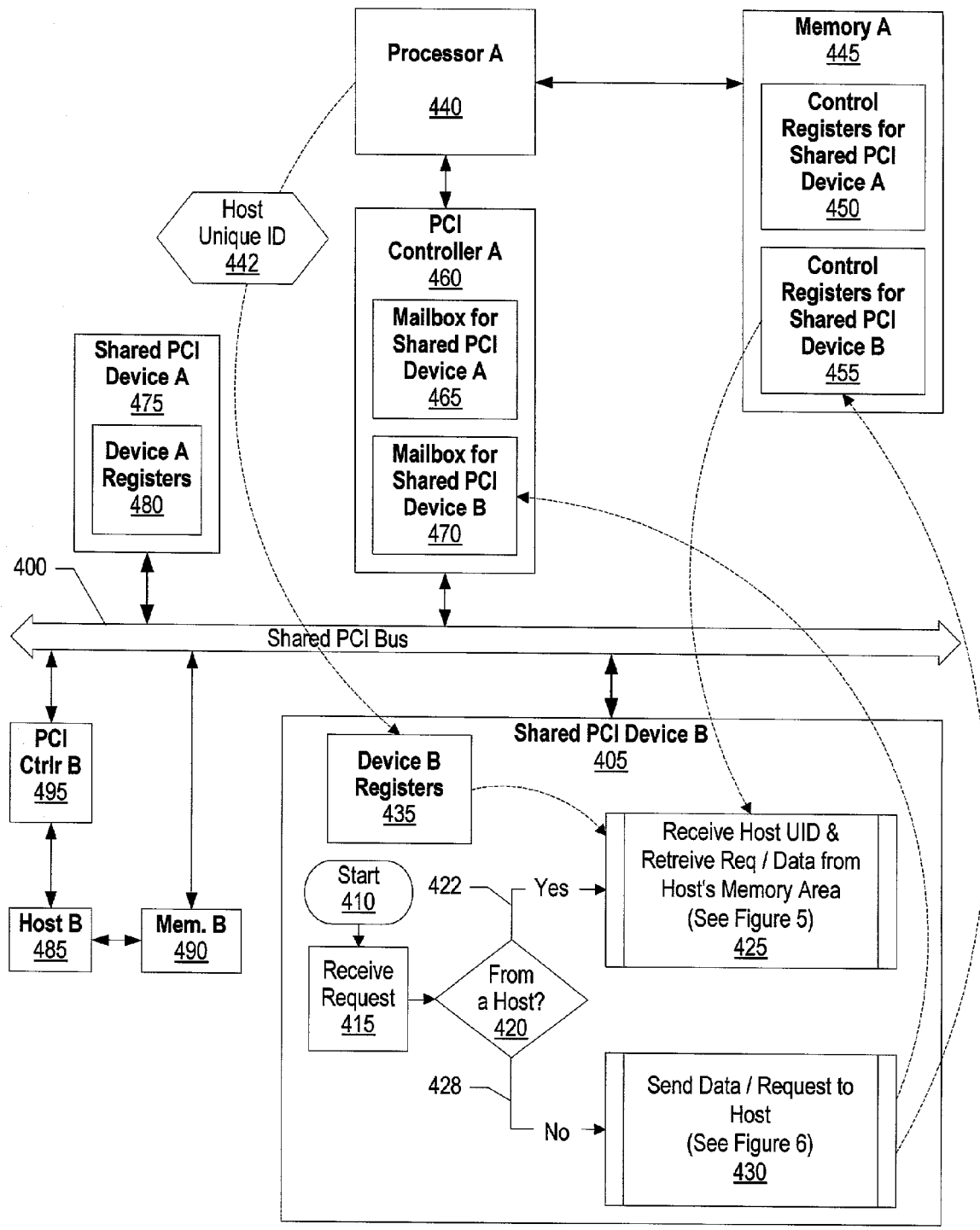
FIG. 4 is a high level flowchart of steps used by a shared PCI device to communicate with a host.

FIG. 4 is a high level flowchart of steps used by a shared PCI device to communicate with a host. FIG. 4 is similar to FIG. 3 but is from the perspective of one of the shared PCI devices, rather than the perspective of one of the host processors.

Shared PCI bus 400 is used to transmit data between processors (440 and 485) and shared PCI devices (405 and 475). The processors each have a PCI-addressable memory area (445 and 490) that include control information for the processors' use of the shared PCI devices (control registers 450 and 455 are shown for Processor A). The host processors use of shared PCI bus 400 is managed by a PCI controller (PCI Controller A (460) manages Processor A's use of the bus, while PCI Controller B (495) manages Processor B's use of the bus). The PCI Controllers each include mailboxes that are used by shared PCI devices for signaling (i.e., interrupting) the host processor (mailboxes 465 and 470 are shown in PCI controller A for shared PCI devices (405 and 475) signaling of Processor A, similar mailboxes are included in PCI controller B (495)).

Shared PCI devices 405 and 475 each include local registers (i.e., local memory area) that the device uses to send, receive, and process data. PCI Device A (475) includes registers 480 and PCI Device B (405) includes registers 435. The specific number and configuration of the device's registers is based upon the device's needs. For example, a shared PCI based LAN adapter likely has differing register needs and configurations than the registers used in a Fibre Channel adapter or in a hardware security module (HSM).

Shared PCI Device B (405) is shown with a high level flowchart showing the device's handling of requests. Processing commences at 410 whereupon the device receives a request (step 415). The request may be from a host requesting that the device perform an operation or the request may be from the device or another device requesting that data be sent to a host. A determination is made as to whether the received request is from a host processor (decision 420). A request from a host is received when a host processor writes the host's unique identifier (442) to the device's control register space (435). If the request is from a host, decision 420 branches to "yes" branch 422 whereupon the shared PCI device receives the host's unique identifier and retrieves the request and data from the host's PCI-addressable memory area (predefined process 425, see FIG. 5 for further details). On the other hand, if the request is to be sent to a host, the data and request are written to the host's PCI-addressable memory area and a register is set in a mailbox assigned to the device in the host's PCI controller (predefined process 430, see FIG. 6 for further details).

Figure 5:
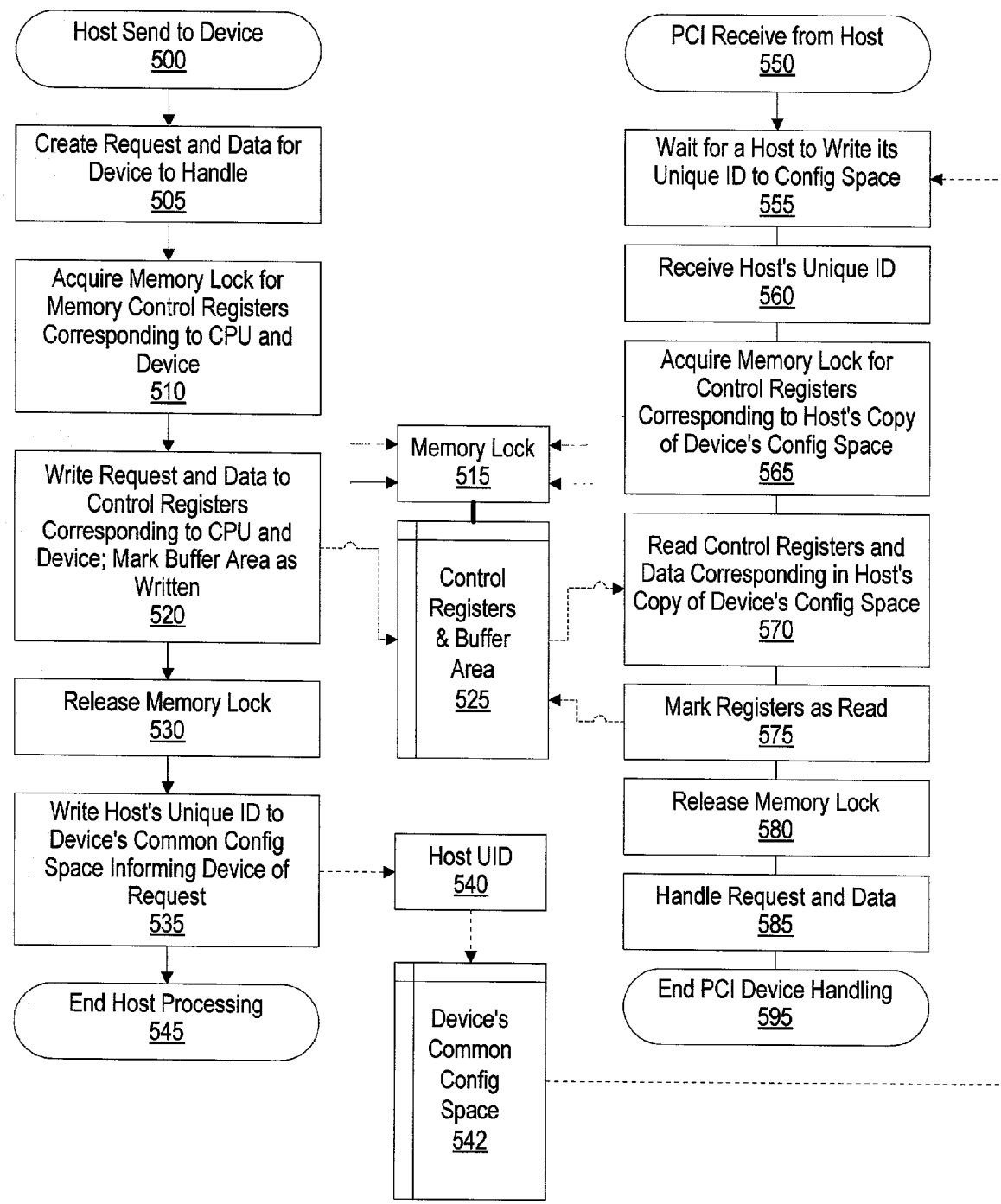
FIG. 5 is a flowchart showing the steps taken for a host to send data to a shared device and corresponding steps taken by the device to receive the data.

FIG. 5 is a flowchart showing the steps taken for a host to send data to a shared device and corresponding steps taken by the device to receive the data. Host processing commences at 500 whereupon the host creates a request and corresponding data for the shared PCI device to handle (step 505). For example, with a shared PCI based LAN adapter, the request may be to send a data packet to another computer system. A memory lock (515) is used to manage access to the host's PCI-addressable memory space used to store control registers and buffer area corresponding to the device. The memory lock is used because both the host and the shared device write and read data to and from the memory area. The host captures the memory lock that controls access to the host's PCI-addressable memory space that corresponds to the device (step 510). Once the memory lock has been acquired, the request and data are written by the host to memory area 525 and the areas that are written are marked accordingly (step 520). The host then releases the memory lock so that the device is able to read and write to the data area (step 530). The host writes its unique identifier (540) to the shared PCI device's common configuration space (542) informing the device that the host has prepared a request for the device to handle (step 535). Host processing ends at 545.

Shared PCI device processing to receive a request from the host commences at 550 whereupon the device, which was waiting for an interrupt from a host, is woken up by the host's request (step 555). The device receives the host's unique identifier from the device's configuration space (step 560 reads from common configuration space 542). The device uses the unique identifier to determine the address of the host's PCI-addressable memory space configured for the device (see initialization processing in FIG. 2 for further details). The device acquires the memory lock that controls access to the PCI-addressable memory space used for the device (step 565). Once the memory lock is acquired, the control registers and buffer spaces that were written by the host are read by the device (step 570). The device marks the control registers and buffer spaces as "read" so that the spaces can be re-used (step 575). The device then releases the memory lock (step 580). The device uses the read control registers and data to perform the request (step 585) and shared PCI device receive processing ends at 595.

Figure 6:
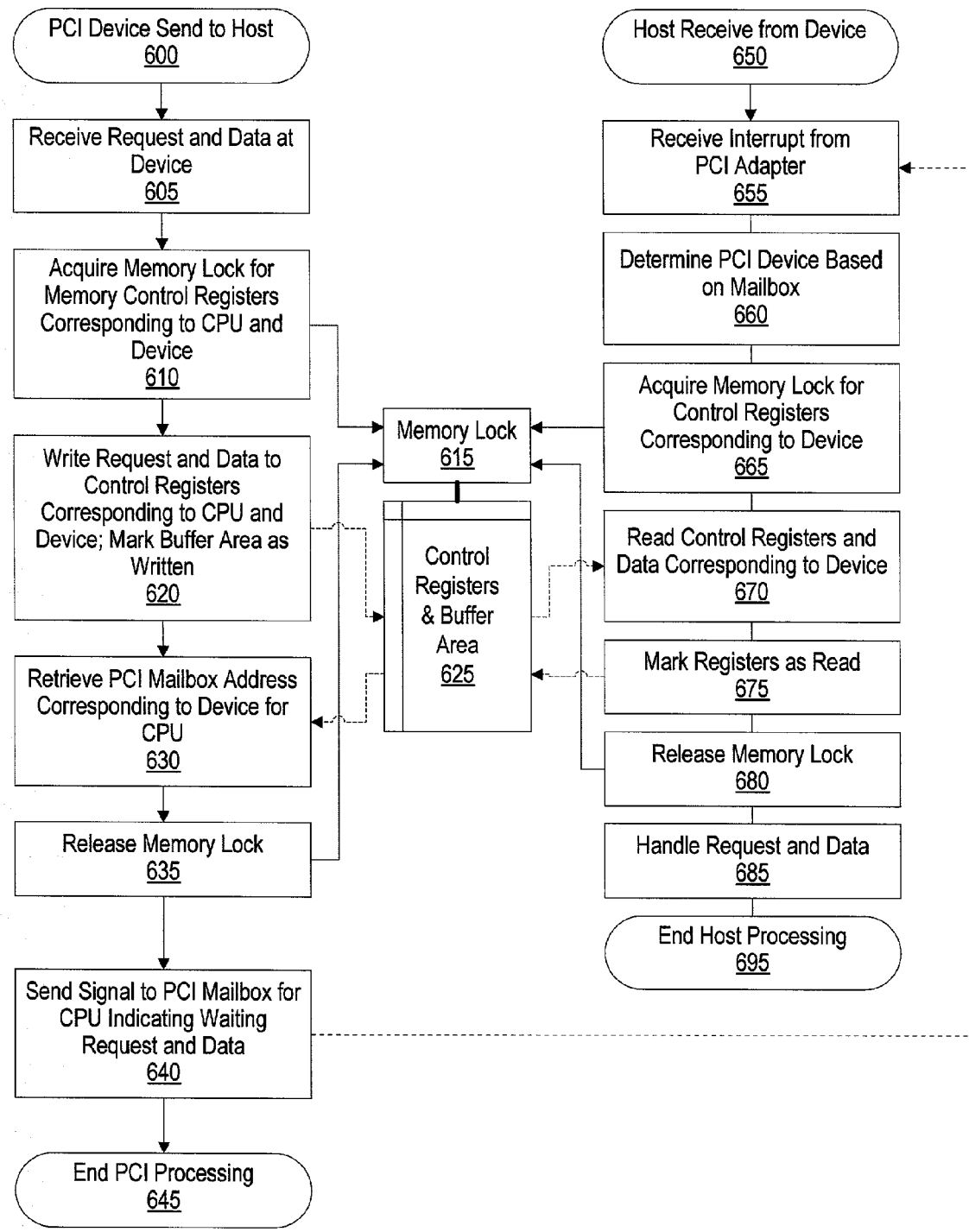
FIG. 6 is a flowchart showing the steps taken for a shared device to send data to a host and corresponding steps taken by the host to receive the data.

FIG. 6 is a flowchart showing the steps taken for a shared device to send data to a host and corresponding steps taken by the host to receive the data. Shared PCI device processing commences at 600 whereupon a request and data intended for a host processor are received at the device (step 605).

The device acquires memory lock (615) that controls access to the host's PCI-addressable memory area (625) that is used for storing control registers and buffer spaces corresponding to the device (step 610). Once the memory lock is acquired, the device writes the request and data to the host's PCI-addressable memory area (step 620 writes to memory space 625). The PCI mailbox address assigned to the device for the host is retrieved (step 630). In one embodiment, the mailbox address is retrieved from the host's PCI addressable memory space. In another embodiment, the mailbox address is assigned during initialization and stored in the device's common configuration area along with other information corresponding to the hosts sharing the device. The device releases the memory lock (step 635). A register in the PCI mailbox assigned to the device is set by the device which causes an interrupt to be sent to the host (step 640) and device send processing ends at 645.

Host receive processing commences at 650 whereupon the host receives an interrupt from the host's PCI adapter (step 655). The host determines which shared PCI device sent the interrupt based upon the assigned mailbox address (step 660). This information is used to determine which PCI-addressable memory space to read. The memory lock (615) that controls access to PCI-addressable memory space 625 is acquired (step 665). The control registers and data are read from PCI-addressable memory space 625 (step 670). The host marks the registers and buffer areas as "read" (step 675) so that the memory areas can be re-used. The host then releases the memory lock that controls access to the PCI-addressable memory space (step 680). The host then handles the request and data received from the shared PCI device (step 685). Host processing to receive data from a shared PCI device ends at 695.

One of the preferred implementations of the invention is an application, namely, a set of instructions (program code) in a code module which may, for example, be resident in the random access memory of the computer. Until required by the computer, the set of instructions may be stored in another computer memory, for example, on a hard disk drive, or in removable storage such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method of sharing one or more devices on a common bus with a plurality of processors, said method comprising:
    configuring a plurality of memory areas, wherein each of the plurality of memory areas corresponds to one of the processors and one of the devices;
    writing data from a first processor selected from the plurality of processors to a first memory area selected from the plurality of memory areas;
    signaling a selected device selected from the one or more devices, wherein the selected device corresponds to the first memory area; and
    reading the first memory area by the selected device.

2. The method as described in claim 1 further comprising:
    writing a host identifier corresponding to the first processor to a device memory area accessible by the selected device; and
    retrieving a memory address stored in the device memory area that corresponds to the host identifier, wherein the reading includes addressing the retrieved memory address.

3. The method as described in claim 1 wherein the common bus is a PCI bus that interconnects the devices and the processors and wherein the memory areas are PCI addressable memory areas.

4. The method as described in claim 1 further comprising:
    writing data from a second processor selected from the plurality of processors to a second memory area selected from the plurality of memory areas;
    signaling the selected device, wherein the selected device corresponds to the second memory area; and
    reading the second memory area by the selected device.

5. A method of sharing a PCI device on a common bus with a plurality of processors, said method comprising:
    configuring a plurality of memory areas, wherein each of the plurality of memory areas corresponds to one of the plurality of processors and the shared PCI device;
    receiving a host identifier from a first processor into a device memory area included in the shared PCI device, the first processor included in the plurality of processors;
    retrieving a memory address stored in the device memory area that corresponds to the host identifier, the memory address corresponding to a first memory area;
    writing data from the shared PCI device to the first memory area included in the plurality of memory areas that corresponds to the first processor;
    signaling the first processor from the shared PCI device; and
    reading the data from the first memory area by the first processor in response to the signaling.

6. The method as described in claim 5 wherein the common bus is a PCI bus that interconnects the device and the processors and wherein the first memory area is a PCI addressable memory area.

7. The method as described in claim 5 further comprising:
writing data from the shared PCI device to a second memory area corresponding to a second processor, the second processor selected from the plurality of processors;
signaling the second processor from the shared PCI device, the signaling including setting a mailbox register assigned to the shared PCI device in a PCI controller that corresponds to the second processor; and
reading the data from the second memory area by the second processor in response to the signaling of the second processor.

8. The method as described in claim 5 wherein the signaling further comprises:
setting a mailbox register in a PCI controller, wherein the PCI controller is interconnected to the first processor and wherein the register is assigned to the shared PCI device.

9. An information handling system comprising:
a plurality of processors each having a unique identifier;
a PCI based device that includes a device memory;
a plurality of PCI addressable memory areas, wherein each of the PCI addressable memory areas corresponds to one of the processors and the PCI based device;
a plurality of PCI controllers, wherein each of the PCI controllers corresponds to one of the processors and wherein each of the PCI controllers includes a PCI mailbox corresponding to the PCI based device;
a common PCI bus that interconnects the PCI based device, the PCI controllers, and the PCI addressable memory; and
a data handling tool for transferring data between the plurality of processors and the PCI based device, the data handling tool including:
means for writing data from a first processor selected from the plurality of processors to the PCI addressable memory area corresponding to the first processor; and
means for the device to read the data from the first processor's PCI addressable memory area using a first PCI addressable memory address.

10. The information handling system as described in claim 9 further comprising:
means for writing the first processor's unique identifier to the device memory;
means for the device to retrieve the first PCI addressable memory address corresponding to the first processor's unique identifier; and
means for the device to process a request based on the data stored in the first processor's PCI addressable memory area.

11. The information handling system as described in claim 10 further comprising:
means for writing data from a second processor selected from the plurality of processors to the PCI addressable memory area corresponding to the second processor;
means for writing the second processor's unique identifier to the device memory;
means for the device to retrieve a second PCI addressable memory address corresponding to the second processor's unique identifier;
means for the device to read the data from the second processor's PCI addressable memory area using the second PCI addressable memory address; and
means for the device to process a request based on the data stored in the second processor's PCI addressable memory area.

12. The information handling system as described in claim 11 further comprising:
means for writing data from the device to a first memory area selected from one of the PCI addressable memory areas;
means for signaling the processor corresponding to the PCI addressable memory area, the signaling including setting a register in the PCI mailbox in the PCI controller corresponding to the processor; and
means for the processor to read the data from the PCI addressable memory area in response to the signaling.

13. The information handling system as described in claim 12 further comprising:
means for assigning the PCI mailbox to the device; and
means for storing the unique identifier and an address corresponding to the PCI mailbox in the device memory.

14. A computer program product stored in a computer operable media for sharing one or more devices on a common bus with a plurality of processors, said computer program product comprising:
means for configuring a plurality of memory areas, wherein each of the plurality of memory areas corresponds to one of the processors and one of the devices;
means for writing data from a first processor selected from the plurality of processors to a first memory area selected from the plurality of memory areas;
means for signaling a selected device selected from the one or more devices, wherein the selected device corresponds to the first memory area; and
means for reading the first memory area by the selected device.

15. The computer program product as described in claim 14 further comprising:
means for writing a host identifier corresponding to the first processor to a device memory area accessible by the selected device; and
means for retrieving a memory address stored in the device memory that corresponds to the host identifier, wherein the reading includes addressing the retrieved memory address.

16. The computer program product as described in claim 14 wherein the common bus is a PCI bus that interconnects the devices and the processors and wherein the memory areas are PCI addressable memory areas.

17. The computer program product as described in claim 14 further comprising:
means for writing responsive data from the selected device to the first memory area;
means for signaling the first processor from the selected device; and
means for reading the responsive data from the first memory area by the first device.

18. The computer program product as described in claim 17 wherein the means for signaling further comprises:
means for setting a register in a bus controller, wherein the bus controller is interconnected to the first processor and wherein the register is assigned to the selected device.

19. The computer program product as described in claim 14 further comprising:
means for writing data from a second processor selected from the plurality of processors to a second memory area selected from the plurality of memory areas;
means for signaling the selected device, wherein the selected device corresponds to the second memory area; and means for reading the second memory area by the selected device.

20. A method of sharing one or more devices on a common bus with a plurality of processors, said method comprising:
configuring a plurality of memory areas, wherein each of the memory areas corresponds to one of the processors and one of the devices;
acquiring a first memory lock that corresponds to a first memory area selected from the plurality of memory areas;
writing data, in response to acquiring the first memory lock, from a first processor selected from the plurality of processors to the first memory area selected from the plurality of memory areas;
signaling a selected device selected from the one or more devices, wherein the selected device corresponds to the first memory area;
acquiring a second memory lock that corresponds to the first memory area, and
reading the first memory area, in response to acquiring the second memory lock, using the selected device.

21. The method as described in claim 20 further comprising:
writing a host identifier corresponding to the first processor to a device memory area that is included in the selected device;
retrieving a memory address stored in the device memory area that corresponds to the host identifier, the memory address corresponding to the first memory area; and
using the retrieved memory address for the reading.

* * * * *